United States Patent [19]

Takahashi et al.

[11] 4,272,497

[45] Jun. 9, 1981

[54] METHOD FOR TREATING A NITROGEN OXIDE- AND SULPHUR OXIDE-CONTAINING WASTE GAS

[75] Inventors: Kazuyoshi Takahashi, Hiratsuka; Hiromi Tanaka, Abiko, both of Japan

[73] Assignees: Sumitomo Heavy Industries, Ltd.; Electric Power Development Co., Ltd., both of Tokyo, Japan

[21] Appl. No.: 172,733

[22] Filed: Jul. 28, 1980

[30] Foreign Application Priority Data

Feb. 8, 1979 [JP] Japan .................................. 54-13736

[51] Int. Cl.³ ............................................. B01D 53/36
[52] U.S. Cl. ................................................. 423/239
[58] Field of Search ................... 423/239, 239 A, 351; 422/169

[56] References Cited

U.S. PATENT DOCUMENTS

| | | | |
|---|---|---|---|
| 4,003,711 | 1/1977 | Hishinuma | 423/239 A X |
| 4,044,102 | 8/1977 | Muraki et al. | 423/239 A |

FOREIGN PATENT DOCUMENTS 52-28462  3/1977  Japan ....................................... 423/239
7409500  7/1974  Netherlands .

*Primary Examiner*—G. O. Peters
*Attorney, Agent, or Firm*—Blanchard, Flynn, Thiel, Boutell & Tanis

[57] ABSTRACT

A method for treating a nitrogen oxide- and sulphur oxide-containing waste gas, in which gaseous ammonia is mixed with said waste gas, the resulting mixed gas is passed in the cross current direction through a first reactor provided with a moving bed of carbonaceous catalyst particles adapted to move downwards, the gas having passed through the upper part of said reaction is discharged outside of the reactor without undergoing treatment, the gas having passed through the lower part of the reactor is mixed with a fresh gaseous ammonia, and this mixed gas is passed in the cross current direction through a second reactor provided with a moving bed of carbonaceous catalyst particles adapted to move downwards and then discharged outside of the reactor.

7 Claims, 6 Drawing Figures

METHOD FOR TREATING A NITROGEN OXIDE- AND SULPHUR OXIDE-CONTAINING WASTE GAS

BACKGROUND OF THE INVENTION

The present invention relates to a method for treating a nitrogen oxide- and sulphur oxide-containing waste gas, in particular improvements in the method for removing the nitrogen oxide and sulphur oxide from said waste gas which comprises introducing the waste gas after it has been mixed with gaseous ammonia into a cross current type moving bed reactor packed with carbonaceous catalyst such as activated carbon.

The method for treating a nitrogen oxide- and sulphur oxide-containing waste gas, which comprises mixing gaseous ammonia to said waste gas and allowing the mixture of waste gas and ammonia to pass through a packed bed of carbonaceous catalyst such as activated carbon or activated carbon supporting thereon a metal oxide such as vanadium pentoxide or the like, may be said advantageous in that it permits not only the simultaneous removal of nitrogen and sulphur oxides but also the regeneration use of the catalyst. In order to remove the nitrogen oxide and sulphur oxide from waste gas efficiently by virtue of this method, however, it is necessary that the reaction temperature should be at least 200° C. or more, preferably in the range of about 220° C. to 250° C. If the reaction temperature is below this range, it will hamper the thorough removal of nitrogen oxide.

In this context, FIG. 1 and FIG. 2 are each a graph illustrating the relation between reaction temperature of the fixed bed reactor and percentage removal of NO (FIG. 1) and between reaction temperature of the fixed bed reactor and percentage removal of $SO_2$ (FIG. 2) in case where 500 ppm of ammonia has been injected in nitrogen gas containing 750 ppm of $SO_2$, 200 ppm of NO, 6% of $O_2$ and 10% of $H_2O$, and this mixed gas has been allowed to pass through an activated carbon catalyst fixed bed reactor for 50 hours at the flow velocity of 0.8 $Nm^3$/hr (which corresponds to the space velocity of 800 $hr^{-1}$). As is evident from FIG. 1 and FIG. 2, in the case of the percentage removal of $SO_2$ it is maintained at the level of 90% or more at the reaction temperature ranging from 120° C. to 220° C. upto 30 hours' gas supply, while in the case of the percentage removal of NO it rapidly decreases as the reaction temperature lowers and drops below the level of 80% at the reaction temperature of 200° C. during about 20 hours' gas supply.

Accordingly, in order to effect the simultaneous removal of nitrogen oxide and sulphur oxide from waste gas by using a carbonaceous catalyst, the reaction temperature must be held at 200° C. at the lowest, but the reaction temperature of 200° C. gives rise to trouble that a part of the carbonaceous catalyst has been consumed by the oxygen in waste gas as represented by the following reaction: $C+O_2 \rightarrow CO_2$. In addition thereto, the aforesaid method is disadvantageous in that normal combustion waste gases from boilers and the like must be heated to a temperature of 200° C. or more prior to treatment because those kinds of gases ordinarily are of a temperature of about 150° C. at the outlet of the air heater or the like.

And, FIG. 3 is a graph illustrating the relation between $SO_2$ concentration and percentage removal of NO in case where the mixed gas was treated under the same conditions as those of the experiments having obtained the results as shown in FIGS. 1 and 2 with the exception that the reaction temperature of the fixed bed reactor was set 150° C. and $SO_2$ concentration was varied within the range of 0–1000 ppm. It will be clearly seen from FIG. 3 that the lower the $SO_2$ concentration in the mixed gas is, the higher the denitrification efficiency can be maintained.

In this context, it may be said that the cross current moving bed reactor in which the gas to be treated is passed through the reactor provided with the moving bed of catalyst particles adapted to move downwards in the cross current direction, namely in the transverse direction, since the inlet side of the moving bed is always in contact with the untreated gas, in principle can be treated as an assembly of fixed beds whose layer thickness is equivalent to the layer height. This leads to that the catalyst dwell time in the moving bed corresponds to the gas supply time to the fixed bed. And, the changes in removal percentage in the fixed bed with the lapse of time correspond to the changes in removal percentage extending from the top to the bottom of the moving bed.

Accordingly, it can be analogized from FIG. 1 that in case where the reaction temperature is low, the cross current moving bed can achieve a relatively high denitrification efficiency at its upper part but only a low denitrification efficiency at its lower part. Viewed in relation to the $SO_2$ concentration, furthermore, it can be analogized from FIG. 3 that a high denitrification efficiency can be achieved at the upper part of the cross current moving bed even when the $SO_2$ concentration is relatively high.

In other words, it may be said that when treating the nitrogen oxide- and sulphur oxide-containing waste gas by means of the cross current moving bed reactor, the nitrogen oxide and sulphur oxide contained in the gas passing through its upper part can be removed well but the gas passing through its lower part still contains considerable quantities of nitrogen oxide and sulphur oxide.

SUMMARY OF THE INVENTION

The present invention provides a method for treating waste gas, which is capable of removing nitrogen and sulphur oxides contained therein effectively by using two or more of cross current moving bed reactors even at a low temperature where the carbonaceous catalyst used is not consumed substantially. According to the method of the present invention, the mixture of nitrogen oxide- and sulphur oxide-containing waste gas and gaseous ammonia is allowed to pass in the cross current direction through a first reactor provided with a moving bed of carbonaceous catalyst particles adapted to move downwards. The gas having passed through the upper part of the first reactor is introduced into a flue without undergoing any treatment. The gas passed through the lower part of the first reactor is mixed with a fresh gaseous ammonia, then is passed in the cross current direction through a second reactor provided with a moving bed of carbonaceous catalyst particles adapted to move downwards, and thereafter is introduced into the flue.

DETAILED DESCRIPTION OF THE INVENTION

The carbonaceous catalyst suitably used for the first and second cross current moving bed reactors according to the present invention includes activated carbon, charcoal, coal, coke and one of these materials supporting metal oxide such as vanadium pentoxide and the like.

According to the present invention, ammonia is injected into not only the gas introduced into the first reactor but also that introduced into the second reactor respectively. In this instance, it is preferable that the quantity of ammonia to be injected should be regulated to the range which is capable of achieving as high a denitrification efficiency as possible and permitting substantially complete elimination of ammonia leakage. In this connection, FIG. 4 is a graph illustrating the relation of the quantity of $NH_3$ to be injected against the percentage removal of NOx and $NH_3$ leakage where $NH_3$ is injected into a boiler waste gas (7000 $Nm^3/hr$.) containing 800 ppm of $SO_2$ and 300 ppm of NOx and the resulting mixed gas is passed at 150° C. through a 10 $m^3$ granular activated carbon packed cross current moving bed reactor.

Figure 1:
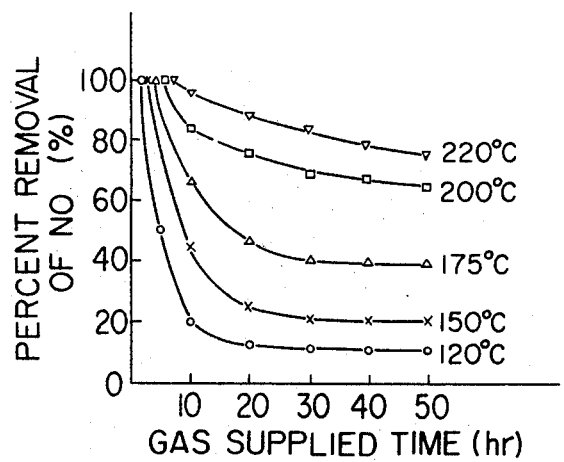
FIG. 1 and FIG. 2 are graphs illustrating the relations of percentage removal of NO and percentage removal of $SO_2$ against the reaction temperature and the reaction time (gas supplied time) in the fixed bed, respectively.
Figure 2:
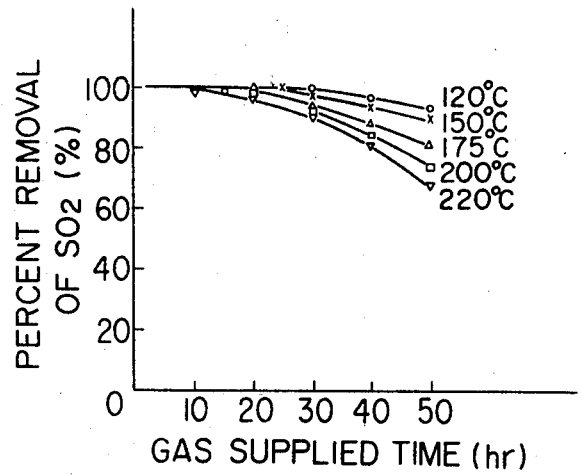
Figure 3:
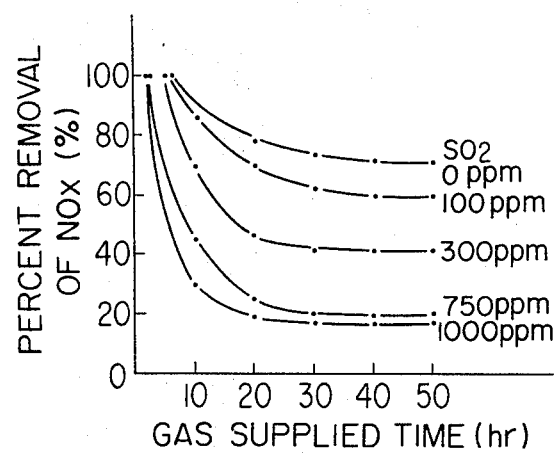
FIG. 3 is a graph illustrating the relation of percentage removal of NO against the $SO_2$ concentration and the reaction time (gas supplied time) in the fixed bed.
Figure 4:
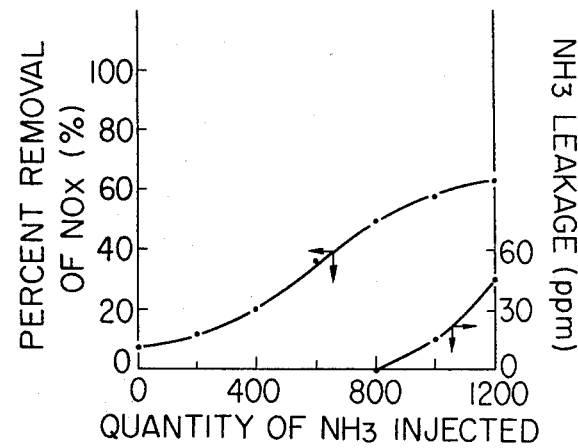
FIG. 4 is a graph illustrating the relation of the quantity of ammonia to be injected against the percentage removal of NOx and ammonia leakage.

It is observed clearly from FIG. 4 that the percentage removal of NOx is improved as the quantity of ammonia to be injected increases, but said result slows down gradually, thereby bringing about ammonia leakage. According to our discovery, the quantity of ammonia to be injected most suitable for the practice of the present invention can experimentally be obtained from the following formula (1), preferably formula (2):

Quantity of ammonia to be injected = (Concentration of NOx)×(Denitrification efficiency)+(Concentration of SOx)×(Desulphurization efficiency)×(0.1−1.0)     (1)

Quantity of ammonia to be injected = (Concentration of NOx)×(Denitrification efficiency)+(Concentration of SOx)×(Desulphurization efficiency)×(0.3−0.6)     (2)

Successively, the method of the present invention will be explained with reference to FIG. 5 and FIG. 6. The nitrogen oxide- and sulphur oxide-containing waste gas is introduced through a line 1 into a cross current moving bed reactor 3. Ammonia is mixed through a line 2 to the waste gas at this time, the quantity of said ammonia preferably being regulated to that determined in accordance with the foresaid formula (1), preferably formula (2). The mixture of waste gas and gaseous ammonia contacts with carbonaceous catalyst bed 4 of activated carbon, etc. moving in said reactor 3 in a direction from the top to the bottom thereof and is discharged from the reactor 3, in which the outlet hood of the catalyst bed 4 is partitioned by means of a dividing wall 5 whereby the gas passed through the upper part of the catalyst bed 4 is discharged through a line 6 and the gas passed through the lower part of the catalyst bed is introduced through a line 7 into a second cross current moving bed reactor 9. The quantity of waste gas to be introduced into the second reactor preferably should be that of gas passed through the portion ⅓ to 4/5 of the lower part of the first reactor 3, namely ⅓ to 4/5 of the total quantity of gas to be supplied into the first reactor.

Ammonia is injected through a line 8 into the gas flowing through a line 7, the quantity of said ammonia being regulated, like the case of the first reactor 3, to that determined by the formula (1), preferably by the formula (2). The ammonia injected gas contacts with a moving bed 10 of carbonaceous catalyst moving in the second reactor 9 in a direction from the top to the bottom thereof, and thereafter is taken out into a line 11 and discharged outside of the system.

Figure 5:
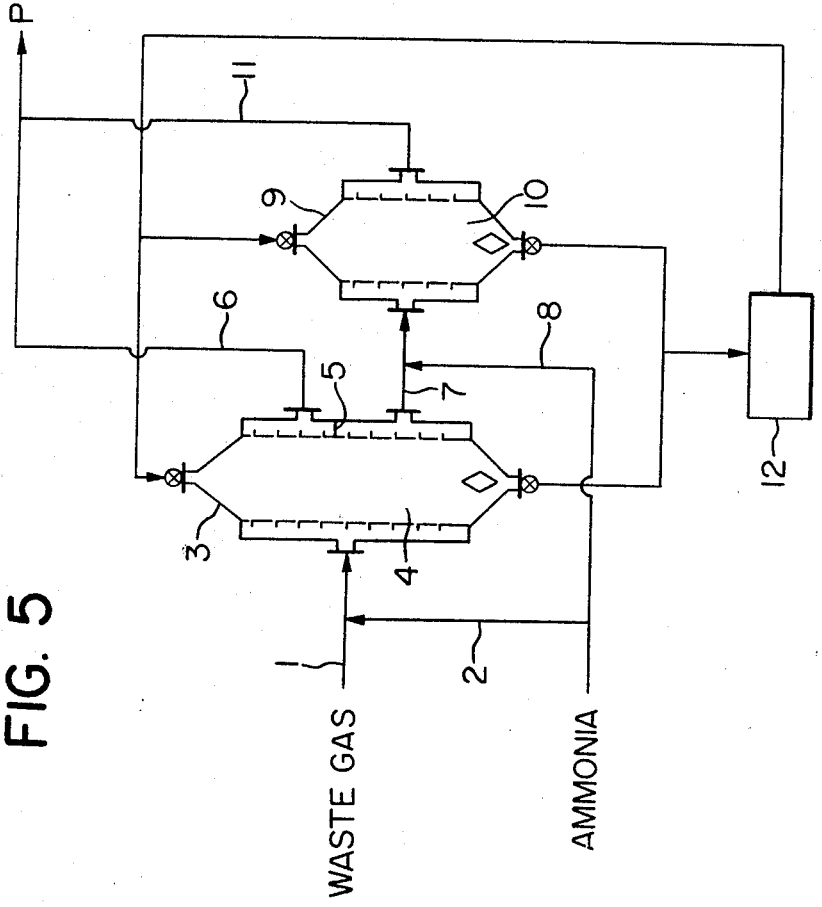
FIG. 5 and FIG. 6 are flow sheets for practicing the method according to the present invention respectively.
Figure 6:
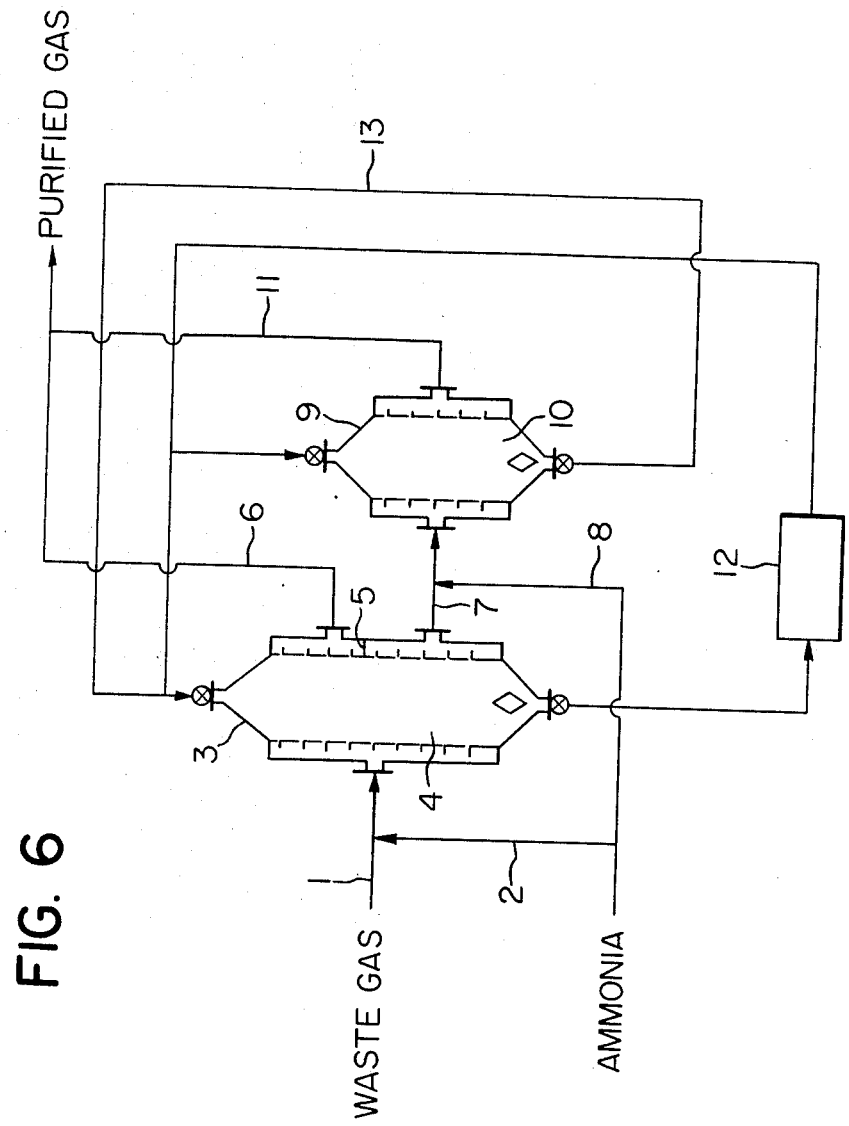

On the other hand, the carbonaceous catalysts withdrawn continuously from the bottoms of the first reactor 3 and second reactor 9, as illustrated in FIG. 5, may be fed to a regenerator 12 for regeneration under a high temperature inert gas atmosphere and thereafter may be recycled into the top portions of the first and second reactors respectively. In this regard, it is also possible, as shown in FIG. 6, to feed only the catalyst withdrawn from the first reactor 3 to the regenerator 12 and recycle the catalyst withdrawn from the second reactor 9 through a line 13 directly to the top portion of the first reactor 3. The employment of catalyst flow as illustrated in FIG. 6 can dispensed with the trouble required for regenerating the carbonecious catalysts having absorbed only a small quantity of SOx thereon, which is of abundant merits in that not only the heat quantities required for regeneration of catalysts can be economized but also the loss of catalysts can be decreased.

The method according to the present invention can be carried out by the use of three or four or more of cross current moving bed reactors, thereby further improving the denitrification efficiency as well as desulphurization efficiency of waste gas. It may be said that there is no difference between the method using three or four or more reactors and the method using two reactors in that even in the former the gases passed through the lower parts of neighbouring upper stream side reactors are injected with ammonia and thereafter are fed into the down stream side reactor or reactors while the gases passed through the upper parts of the upper stream side reactors are introduced into the flue directly without undergoing any treatment.

PREFERRED EMBODIMENTS

EXAMPLE 1

A coal burning boiler waste gas containing 800 ppm of sulphur oxide and 300 ppm of nitrogen oxide was derived therefrom at a flow velocity of 10,000 $Nm^3/hr$. and mixed with 500 ppm of gaseous ammonia, and thereafter the resulting mixed gas having a temperature of 150° C. was introduced into a cross current moving bed reactor packed with 10 $m^3$ of granular activated carbon. The activated carbon dwell time in the reactor amounts to 36 hours in this instance. One-third of the gas introduced into said reactor was taken off from the top part of the reactor to thereby obtain the denitrification efficiency of 76% and the desulfurization efficiency of 99%. The remaining two-thirds of said introduced gas was taken off at the bottom of the reactor, remixed with 250 ppm of gaseous ammonia and introduced into a cross current moving bed reactor packed with 6.6 m³ granular activated carbon, said reactor being another one from the former reactor. The activated carbon dwell time in the reactor amounts to 40 hours in this instance. The denitrification and desulfurization efficiencies of the gas derived from said reactor were 61% and 99.9% respectively on the basis of the gas introduced into the first reactor. In course of the above mentioned gas treatment, the gas derived from the portion ⅓ of the top part of the first reactor and the gas derived from the second reactor were united and mixed together. The results thus obtained showed the denitrification efficiency of 66% and the desulfurization efficiency of 99.6% on the basis of the original waste gas.

In comparison, the waste gas containing 800 ppm of sulphur oxide and 300 ppm of nitrogen oxide and having the same flow velocity was mixed with 650 ppm of gaseous ammonia and then the resulting mixed gas having a temperature of 150° C. was introduced into a cross current moving bed reactor packed with 16.6 m³ of granular activated carbon. In this instance, the activated carbon dwell time in the reactor amounts to 35 hours. The waste gas derived from said reactor showed the denitrification efficiency of 42% and the desulphurization efficiency of 96%.

EXAMPLE 2

A coal burning boiler waste gas containing 800 ppm of sulphur oxide and 300 ppm of nitrogen oxide was derived therefrom at a flow velocity of 10,000 Nm³/hr. and mixed with 500 ppm of gaseous ammonia, and thereafter the resulting mixed gas having a temperature of 150° C. was introduced into a cross current moving bed reactor packed with 10 m³ of granular activated carbon. The activated carbon dwell time in the reactor amounts to 32 hours in this instance. One-third of the gas introduced into said reactor was taken off from the top part of the reactor, thereby obtaining the denitrification efficiency of 80% and the desulfurization efficiency of 99%. The remaining two-thirds of said introduced gas was taken off at the bottom of the reactor, remixed with 250 ppm of gaseous ammonia and introduced into another reactor, namely a second cross current moving bed reactor packed with 6.6 m³ of granular activated carbon. The activated carbon dwell time in the reactor amounts to 42 hours in this instance. The denitrification and desulfurization efficiencies of the gas derived from the top part of said reactor were 77% and 99.9% respectively on the basis of the gas introduced into the first reactor. Additionally, the remaining two-thirds of the gas introduced into said reactor was taken off at the bottom of the reactor, mixed again and again with 100 ppm of gaseous ammonia and introduced into a third cross current moving bed reactor. In this instance, said reactor is packed with 4.4 m³ of activated carbon, and the activated carbon dwell time in the reactor amounts to 60 hours. The denitrification and desulfurization efficiencies of the waste gas derived from this reactor were 85% and 100% respectively on the basis of the gas introduced into the first reactor. In course of the above mentioned three-stage gas treatment, the gas taken off from the portion ⅓ of the top part of the first reactor, the gas taken off from the portion ⅓ of the top part of the second reactor and the gas derived from the third reactor were united and mixed together, whereby the thus obtained denitrification and desulfurization efficiencies were 82% and 99.7% respectively on the basis of the original gas.

In comparison, the waste gas containing 800 ppm of sulphur oxide and 300 ppm of nitrogen oxide and having the same flow velocity was mixed with 700 ppm of gaseous ammonia and then the resulting mixed gas having a temperature of 150° C. was introduced into a cross current moving bed reactor packed with 21 m³ of granular activated carbon. The activated carbon dwell time in the reactor amounts to 39 hours in this instance. The waste gas derived from said reactor showed the denitrification efficiency of 51% and the desulfurization efficiency of 98% respectively.

What is claimed is:

1. A method for removing nitrogen oxides and sulphur oxides from waste gas which comprises the steps of: mixing gaseous ammonia with a nitrogen oxide- and sulphur oxide-containing waste gas; passing the resulting mixed gas in a cross current direction through a first reactor provided with a moving bed of carbonaceous catalyst adapted to move downwards; introducing the gas passed through the upper part of said reactor into a flue without undergoing any treatment; re-mixing the gas passed through the bottom part of the reactor with a fresh gaseous ammonia; thereafter allowing said mixed gas to pass in a cross current direction through a second reactor provided with a moving bed of carbonaceous catalyst adapted to move downwards; and introducing the gas passed through said reactor into the flue.

2. A method as claimed in claim 1, wherein said carbonaceous catalyst is activated carbon, charcoal, coal, coke or one of these materials supporting oxidized metal thereon.

3. A method as claimed in claim 1, wherein the quantity of ammonia to be injected in the gas supplied to each reactor is determined by the following formula:

Quantity of ammonia to be injected = (Concentration of NOx) × (Denitrification efficiency) + (Concentration of SOx) × (Desulphurization efficiency) × (0.1 − 1.0).

4. A method as claimed in claim 1, wherein the quantity of ammonia to be injected in the gas supplied to each reactor is determined by the following formula:

Quantity of ammonia to be injected = (Concentration of NOx) × (Denitrification efficiency) + (Concentration of SOx) × (Desulphurization efficiency) × (0.3 − 0.6).

5. A method as claimed in claim 1 which comprises providing, downstream of the second reactor, a third reactor having a moving bed of carbonaceous catalyst adapted to move downwards, and allowing the gas passed through the bottom part of the second reactor after it has been mixed with a fresh gaseous ammonia to pass through the third reactor in a cross current direction.

6. A method as claimed in claim 1 which comprises connecting four or more reactors in series, said reactor having a moving bed of carbonaceous catalyst adapted to move downwards, and allowing the gas passed through the bottom part of one upstream reactor after it has been mixed with gaseous ammonia to pass through a downstream reactor adjacent thereto in a cross current direction.

7. A method as claimed in claim 1 which comprises supplying the carbonaceous catalyst derived at the bottom of the second reactor, without undergoing regeneration, to the top part of the first reactor and supplying the carbonaceous catalyst derived at the bottom of the first reactor, after it has been regenerated, to the top part of each of the first and second reactors.

* * * * *